United States Patent
Uenishi et al.

(10) Patent No.: US 12,405,591 B2
(45) Date of Patent: Sep. 2, 2025

(54) NUMERICAL CONTROL DEVICE AND CONTROL METHOD

(71) Applicant: FANUC CORPORATION, Yamanashi (JP)

(72) Inventors: Daisuke Uenishi, Yamanashi (JP); Kenji Kaihara, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 414 days.

(21) Appl. No.: 17/997,796

(22) PCT Filed: May 14, 2021

(86) PCT No.: PCT/JP2021/018411
§ 371 (c)(1),
(2) Date: Nov. 2, 2022

(87) PCT Pub. No.: WO2021/235346
PCT Pub. Date: Nov. 25, 2021

(65) Prior Publication Data
US 2023/0350375 A1    Nov. 2, 2023

(30) Foreign Application Priority Data
May 21, 2020   (JP) ................................. 2020-088678

(51) Int. Cl.
G05B 19/402    (2006.01)
G05B 19/4155   (2006.01)

(52) U.S. Cl.
CPC ....... *G05B 19/402* (2013.01); *G05B 19/4155* (2013.01)

(58) Field of Classification Search
USPC ....................................................... 700/114
See application file for complete search history.

(56) References Cited

U.S. PATENT DOCUMENTS

| | | | | |
|---|---|---|---|---|
| 5,400,260 A | * | 3/1995 | Matsumura | G05B 19/40937 318/568.1 |
| 2007/0100493 A1 | * | 5/2007 | Fujibayashi | G05B 19/4148 700/169 |

(Continued)

FOREIGN PATENT DOCUMENTS

| | | |
|---|---|---|
| CN | 103116316 A | 5/2013 |
| CN | 110543139 A | 12/2019 |

(Continued)

OTHER PUBLICATIONS

Lynch, "Setting Up User Defined G and M Codes", May 2019, CNCCI, webpage, retrieved from www.cncci.com/post/setting-up-user-defined-g-and-m-codes Mar. 8, 2025; 4 pages. (Year: 2019).*

(Continued)

*Primary Examiner* — Ziaul Karim
*Assistant Examiner* — Joshua T Sanders
(74) *Attorney, Agent, or Firm* — Studebaker Brackett PLLC

(57) ABSTRACT

Provided are a numerical control device and a control method that enable simple true circular processing. The numerical control device is provided with: a true circular processing unit that, using an operative command, causes a cutting tool to perform true circular processing on a workpiece with a starting point set as a center; and a processing program calculation unit that, in order to give a command to a machining tool, calculates, as an operative command for the machining tool, a processing operation position from a single line processing program.

4 Claims, 5 Drawing Sheets

(56) References Cited

U.S. PATENT DOCUMENTS

| | | | |
|---|---|---|---|
| 2015/0205294 A1* | 7/2015 | Song | G05B 19/4099 700/182 |
| 2016/0039014 A1* | 2/2016 | Uenishi | B23C 1/14 700/192 |
| 2022/0179388 A1* | 6/2022 | Sagasaki | G05B 19/182 |

FOREIGN PATENT DOCUMENTS

| | | |
|---|---|---|
| JP | S57-113109 A | 7/1982 |
| JP | H03-206504 A | 9/1991 |
| JP | 2019-070953 A | 5/2019 |
| WO | 1994/009420 A1 | 4/1994 |

OTHER PUBLICATIONS

International Search Report issued in PCT/JP2021/018411; mailed Jul. 20, 2021.

\* cited by examiner

FIG. 2
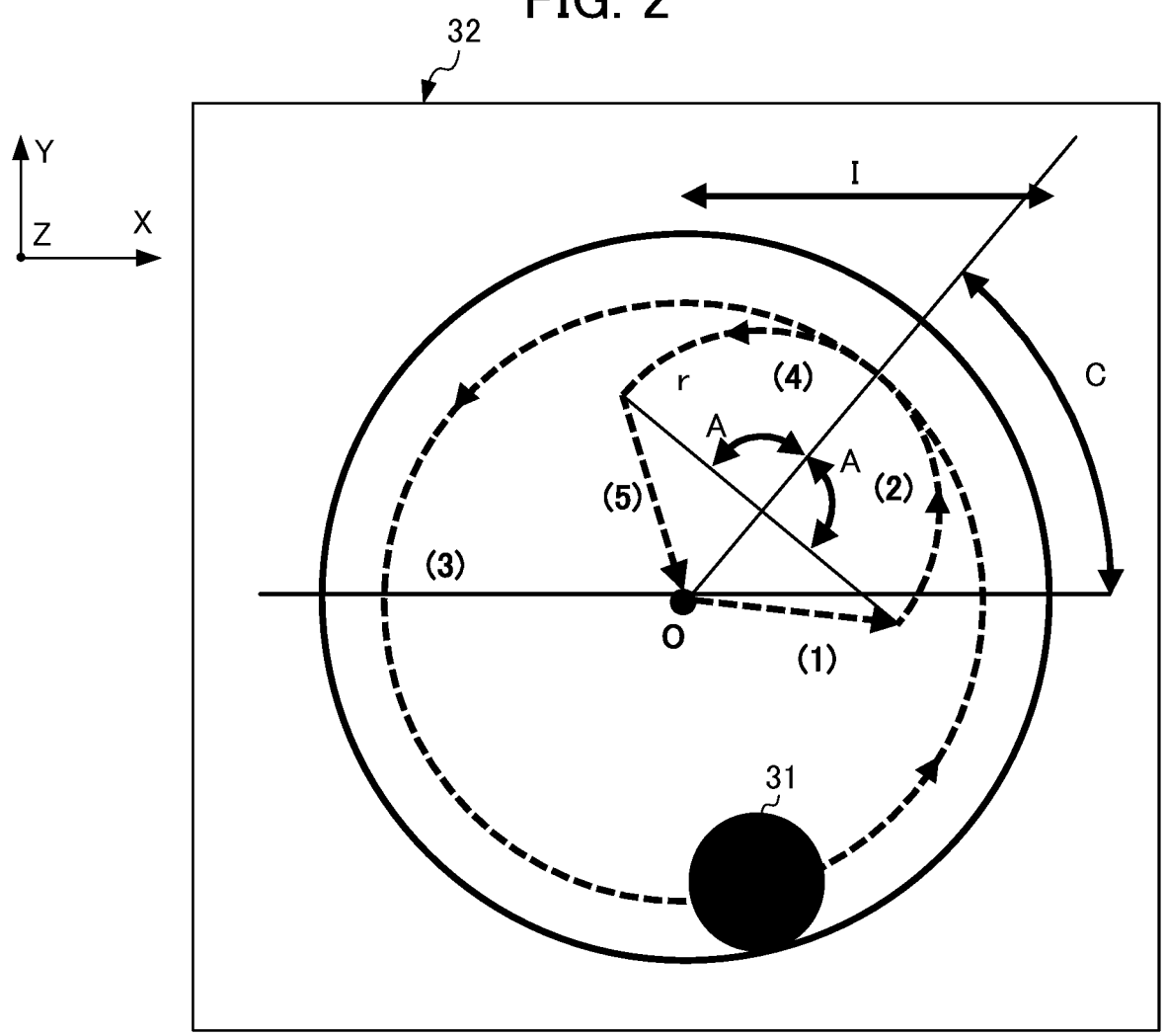
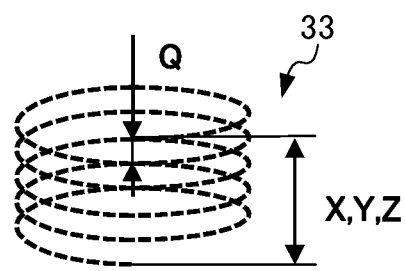

FIG. 3

EXAMPLE OF G-CODE $$\begin{Bmatrix} G102 \\ G103 \end{Bmatrix} \begin{Bmatrix} G41 \\ G42 \end{Bmatrix} \begin{Bmatrix} G17 \\ G18 \\ G19 \end{Bmatrix} \text{I\_ C\_ R\_ A\_} \begin{Bmatrix} X\_ \\ Y\_ \\ Z\_ \end{Bmatrix} \text{Q\_ D\_ F\_ E\_}$$

|  | PARAMETER |
|---|---|
| ESSENTIAL | I : RADIUS OF CIRCLE TO BE MACHINED (mm) |
| OPTIONAL | $G_1$ : TOOL DIAMETER CORRECTION |
|  | $G_2$ : PLANE SELECTION |
|  | C : START POSITION (deg) |
|  | R : ADVANCE/RETRACTION RADIUS VALUE (mm) |
|  | A : APPROACH ANGLE(deg) |
|  | X : HELICAL MOVEMENT IN X-AXIS DIRECTION (mm) |
|  | Y : HELICAL MOVEMENT IN Y-AXIS DIRECTION (mm) |
|  | Z : HELICAL MOVEMENT IN Z-AXIS DIRECTION (mm) |
|  | Q : PITCH IN X-, Y-, AND Z-AXIS DIRECTIONS |
|  | D : TOOL DIAMETER CORRECTION (NUMBER) |
|  | F : MACHINING FEED SPEED (mm/min) |
|  | E : APPROACH SPEED (mm/min) |

NUMERICAL CONTROL DEVICE AND CONTROL METHOD

TECHNICAL FIELD

The present invention relates to a numerical control device and a control method.

BACKGROUND ART

Typically, a numerical control device that controls, e.g., a machine tool, executes, e.g., workpiece machining by a machining program (see, e.g., Patent Document 1). A machining program processing device described in Patent Document 1 calculates a correction reference point based on a tool tip point command position and a tool posture command angle commanded by the machining program and the dimensions of a tool, and rewrites the tool tip point command position to the position of the correction reference point.

Patent Document 1: Japanese Unexamined Patent Application, Publication No. 2019-70953

DISCLOSURE OF THE INVENTION

Problems to be Solved by the Invention

The numerical control device also machines a true circular shape into the workpiece according to a machining (control) program. However, for machining the true circular shape into the workpiece, a coordinate value needs to be calculated in consideration of machining start and end positions. Although such calculation is a simple calculation according to a trigonometric function SIN/COS, a calculator is required and a program is redundant. For this reason, it is difficult to manage and correct such a program. Thus, the technique of easily creating a machining program by CAD/CAM by automatic calculation of a coordinate value has been employed.

However, for creating the machining program by CAD/CAM, a worker who has a skill for operation is required. For machining program correction accompanied by a coordinate value change such as a machining start position change, operation by CAD/CAM is required on each occasion.

Recently in thread cutting etc., helical machining with a cutting tool which is a cutting blade having a screw thread shape has been increasingly employed, unlike typical synchronized machining of a spindle and a moving shaft. In such machining, helical machining needs to be continuously commanded and performed at a screw thread pitch until reaching a specified position. A cutting tool supplier etc. supply tools for providing programs for continuous commanding. However, as in CAD/CAM, operation with the tool needs to be performed on each occasion for machining program correction accompanied by a coordinate value change. Moreover, the program is still redundant as in the CAD/CAM.

For these reasons, for automatically creating and executing a program for easily performing true circular machining on a machine, the technique of creating a macro program by using a variable is employed. However, for creating the macro program, a professional who is familiar with a command rule of the numerical control device and has a skill for programming is required. For this reason, there has been a demand for easy execution of true circular machining.

Means for Solving the Problems

A numerical control device according to the present disclosure includes a machining program computing unit that computes, as a command executable by a machine tool, a machining position from a one-line machining program for commanding the machine tool, and a true circular machining unit that performs true circular machining on a workpiece about a start point as a center with a cutting tool according to the executable command.

A numerical control device control method according to the present disclosure includes the step of computing, as a command executable by a machine tool, a machining position from a one-line machining program for commanding the machine tool, and the step of true circular machining on a workpiece about a start point as a center with a cutting tool of the machine tool according to the executable command.

Effects of the Invention

According to the present invention, true circular machining can be easily performed.

BRIEF DESCRIPTION OF THE DRAWINGS

FIG. 2 is a view showing the outline of true circular machining by a machine tool;
FIG. 3 is a view showing a specific example of a machining program.

PREFERRED MODE FOR CARRYING OUT THE INVENTION

Figure 1:
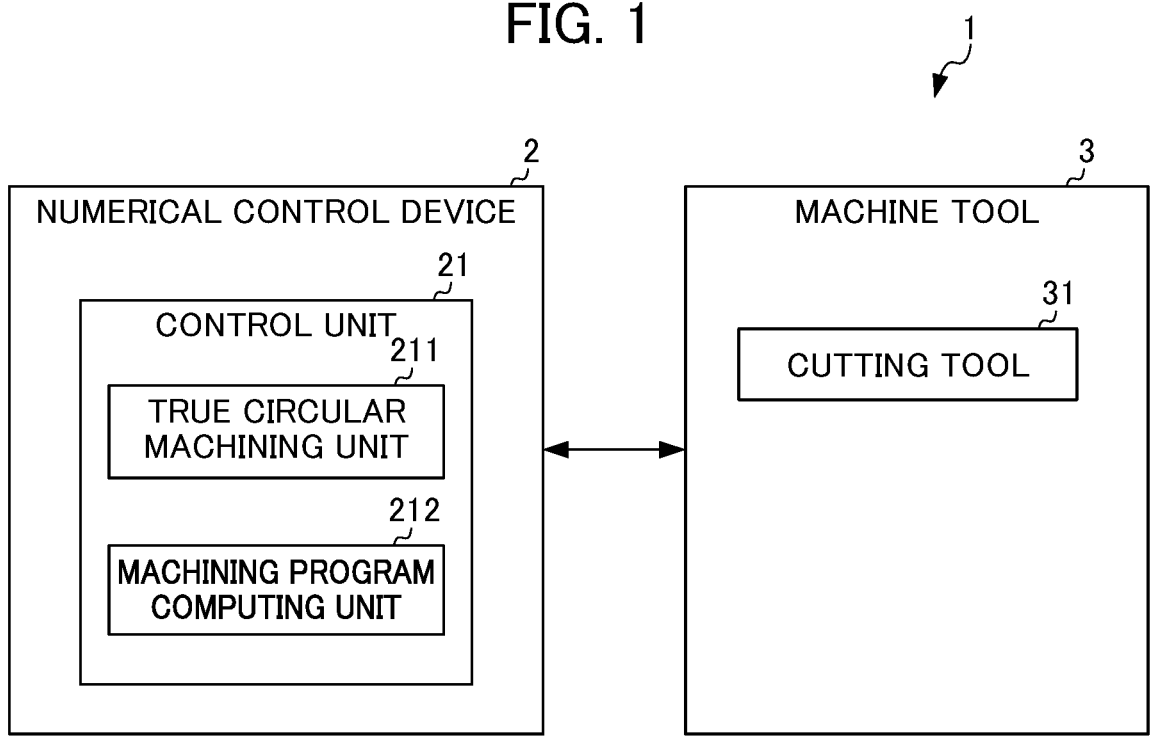
FIG. 1 is a diagram showing the configuration of a machining system.

FIG. 1 is a diagram showing the configuration of a machining system 1. As shown in FIG. 1, the machining system 1 includes a numerical control device 2 and a machine tool 3.

The numerical control device 2 is a device that controls the machine tool 3 to perform, e.g., predetermined machining. The numerical control device 2 includes a control unit 21. The control unit 21 is a processor such as a central processing unit (CPU), and functions as a true circular machining unit 211 and a machining program computing unit 212 by executing programs stored in a storage unit (not shown).

The machine tool 3 is a device that performs the predetermined machining such as cutting, tool measurement, etc. based on control by the numerical control device 2.

The machine tool 3 includes, for example, a motor driven to machine a workpiece 32, a spindle and a feed shaft attached to the motor, a jig and a tool for each of these shafts, and a table T for fixing the workpiece 32. The machine tool 3 drives the motor based on an operation command output from the numerical control device 2, thereby performing the predetermined machining. Specifically, the machine tool 3 includes a cutting tool 31.

The true circular machining unit 211 performs true circular machining on the workpiece about a start point as a center with the machine tool 3. The machining program computing unit 212 computes, as a command executable by the machine tool, a machining position from a one-line machining program for commanding the machine tool 3 to operate the true circular machining unit 211.

FIG. 2 is a view showing the outline of true circular machining by the machine tool 3. The machine tool 3 performs true circular machining on the workpiece 32 with the cutting tool 31 by the following steps (1) to (5).

(1) The cutting tool 31 moves to (approaches) the workpiece 32.
(2) The cutting tool 31 advances into the workpiece 32.
(3) The cutting tool 31 cuts the workpiece 32.
(4) The cutting tool 31 retracts from the workpiece 32.
(5) The cutting tool 31 moves from (approaches) the workpiece 32. In FIG. 2, a reference character O indicates the start point, a reference character (a parameter) I indicates the radius of a true circle to be machined, a reference character (a parameter) A indicates an approach angle of the cutting tool 31, and a reference character (a parameter) C indicates the angle of the start point with respect to a reference line.

Moreover, a reference numeral 33 in FIG. 2 indicates the trajectory of machining by the cutting tool 31. Reference characters (parameters) X, Y, and Z each indicate helical movement of the cutting tool 31 in X-, Y-, and Z-directions, and mean a start point on a specified plane. A reference character (a parameter) Q indicates the pitch of the cutting tool 31 in the X-, Y-, and Z-directions.

FIG. 3 is a view showing a specific example of the machining program. In the machining program, G102 indicates a G-code for a clockwise true circular cutting cycle, and G103 indicates a G-code for a counterclockwise true circular cutting cycle. G41 indicates that the tool diameter of the cutting tool 31 is corrected in a leftward direction in a cutting direction, and G42 indicates that the tool diameter is corrected in a rightward direction in the cutting direction.

In the machining program, G17 indicates that an XY plane is selected as a plane on which cutting by the cutting tool 31 is to be performed, G18 indicates that a ZX plane is selected as the plane on which cutting by the cutting tool 31 is to be performed, and G19 indicates that a YZ plane is selected as the plane on which cutting by the cutting tool 31 is to be performed.

Either one of G102 or G103 is selected when the machining program is created. Neither G41 nor G42 is selected when the machining program is created, or either one of G41 or G42 is selected when the machining program is created. Any one of G17, G18, or G19 is selected when the machining program is created.

In the machining program, the parameter I indicates the radius of the circle to be machined by the cutting tool 31, and a parameter F indicates a feed speed for cutting by the cutting tool 31. The parameter I is an essential parameter, and in a case where no parameter F is commanded, a last commanded feed speed is used as the parameter F.

Moreover, in the machining program, a parameter $G_1$ indicates tool diameter correction, and a parameter $G_2$ indicates selection of the plane on which cutting by the cutting tool 31 is to be performed. The parameter C indicates the start position by an angle. A parameter R indicates the radius of a trajectory along which the cutting tool 31 advances into the workpiece 32 or retracts from the workpiece 32. The parameter A indicates the approach angle of the cutting tool 31, and the parameters X, Y, and Z each indicate helical movement of the cutting tool 31 in the X-, Y-, and Z-directions and means the start point on the specified plane. The parameters X, Y, and Z are set according to G17 (the XY plane is specified), G18 (the XZ plane is specified), and G19 (the YZ plane is specified) as described above.

The parameter Q is the pitch of the cutting tool 31 in the X-, Y-, and Z-axis directions, and indicates that continuous helical machining is executed the number of times, which is obtained in such a manner that a difference between a numerical value in the direction of an axis perpendicular to the specified plane and a command-executed position is divided by the pitch, in the commanded axial direction. A parameter D indicates tool diameter correction (number) for the cutting tool 31. A parameter E is an approach speed of the cutting tool 31, and in a case where there is no command, cutting is executed by fast-forwarding. Note that the above-described parameters other than the parameter I are optionally-set parameters. For example, in a case where there is no command, the parameter A is 90° and the parameter C is 0°.

As described above, according to the present embodiment, the numerical control device 2 includes the true circular machining unit 211 that performs true circular machining on the workpiece 32 about the start point as a center with the cutting tool 31 of the machine tool 3 and the machining program computing unit 212 that computes, as the command executable by the machine tool 3, the machining position from the one-line machining program for commanding the machine tool 3 to operate the true circular machining unit 211.

Typically, a worker needs to create a macro program having branches according to various machining specifications, and also needs to have a skill for programming. Moreover, in the case of a typical program for true circular machining, a coordinate value of each point, start and end points of an arc, etc. need to be calculated, and for this reason, the program is redundant and it takes time to create the machining program. The numerical control device 2 according to the present embodiment computes, as the command executable by the machine tool 3, the machining position from the one-line machining program for commanding the machine tool 3 to operate the true circular machining unit 211. With this configuration, the numerical control device 2 can easily create the true circular cutting cycle with reference to the start point, can prevent the redundancy of the machining program, and can shorten the time for creating the machining program.

The machining program includes the G-code, the radius of the true circle to be machined, the start position, the radius of the trajectory along which the cutting tool advances into the workpiece or retracts from the workpiece, the approach angle of the cutting tool 31, the amount of helical movement in each linear axis upon helical machining by the cutting tool 31, the pitch in each linear axis upon helical machining, the tool diameter correction number for the cutting tool, the feed speed for cutting by the cutting tool 31, and the approach speed of the cutting tool 31. With this configuration, the numerical control device 2 can properly create the machining program for true circular machining.

The machining program computing unit 212 can change, in the machining program, tool diameter correction, selection of the plane on which cutting by the cutting tool 31 is to be performed, the start position, the radius of the trajectory along which the cutting tool 31 advances into the workpiece 32 or retracts from the workpiece 32, the helical movement amount, the pitch, the tool diameter correction number, the feed speed, and the approach speed. With this configuration, the numerical control device 2 can set each parameter of the machining program to a proper value.

According to the description above, in the case of creating, e.g., the one-line machining program for performing true circular machining, if operation is performed according to the machining program created only with the parameter I, the parameter F is the last commanded feed speed, the parameter R is the half of I, the parameter A is 90°, and the parameter C is 0°. Since there is no command for the parameters X, Y, and Z, there is no helical movement. The start point is a location commanded by the machining program. Since there is no command for the parameter Q, there is no continuous helical movement. Since there is no command for the parameter E, true circular machining is executed from a start position in the X-axis direction by fast-forwarding.

In the case of creating the one-line machining program, the program may be created using operation of a panel of the numerical control device, an interactive function of the numerical control device, or CAD/CAM.

According to the machining program, machining may be performed, as in a drilling and fixing cycle, under a specified condition at an optional position on a commanded plane until a cancellation code is read after G-code commanding. For example, in a case where no cancellation code is commanded after commanding of the one-line machining program, when the optional position (the X-axis, the Y-axis, and the Z-axis) on the commanded plane is commanded, the commanded optional position is taken as the start point, and true circular machining is performed on the workpiece about the start point as a center with the cutting tool without changing the condition. With this configuration, multiple true circular machining commands can be provided without repeatedly commanding the parameters.

Figure 4:
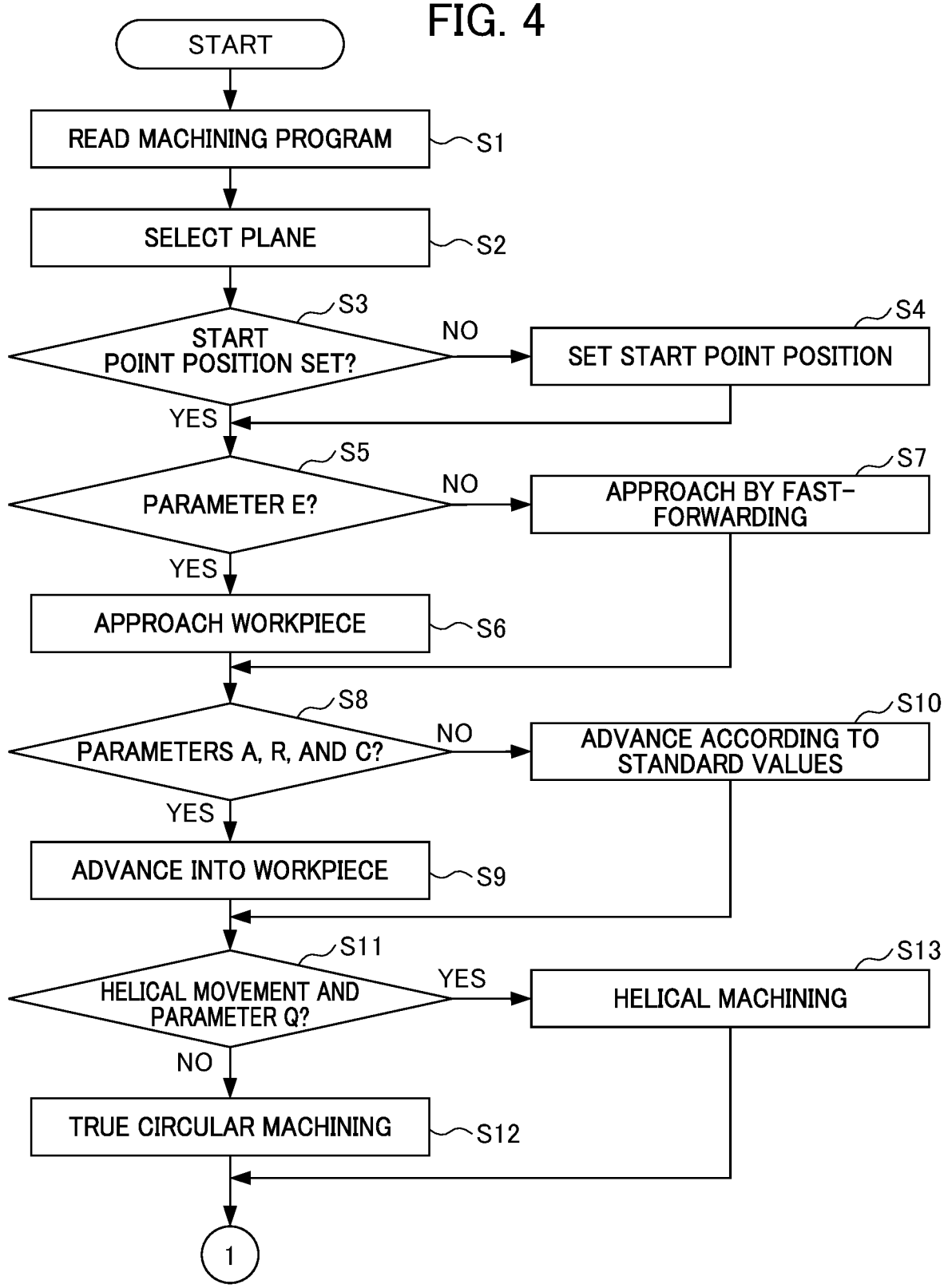
FIG. 4 is a flowchart showing the processing of a numerical control device.
Figure 5:
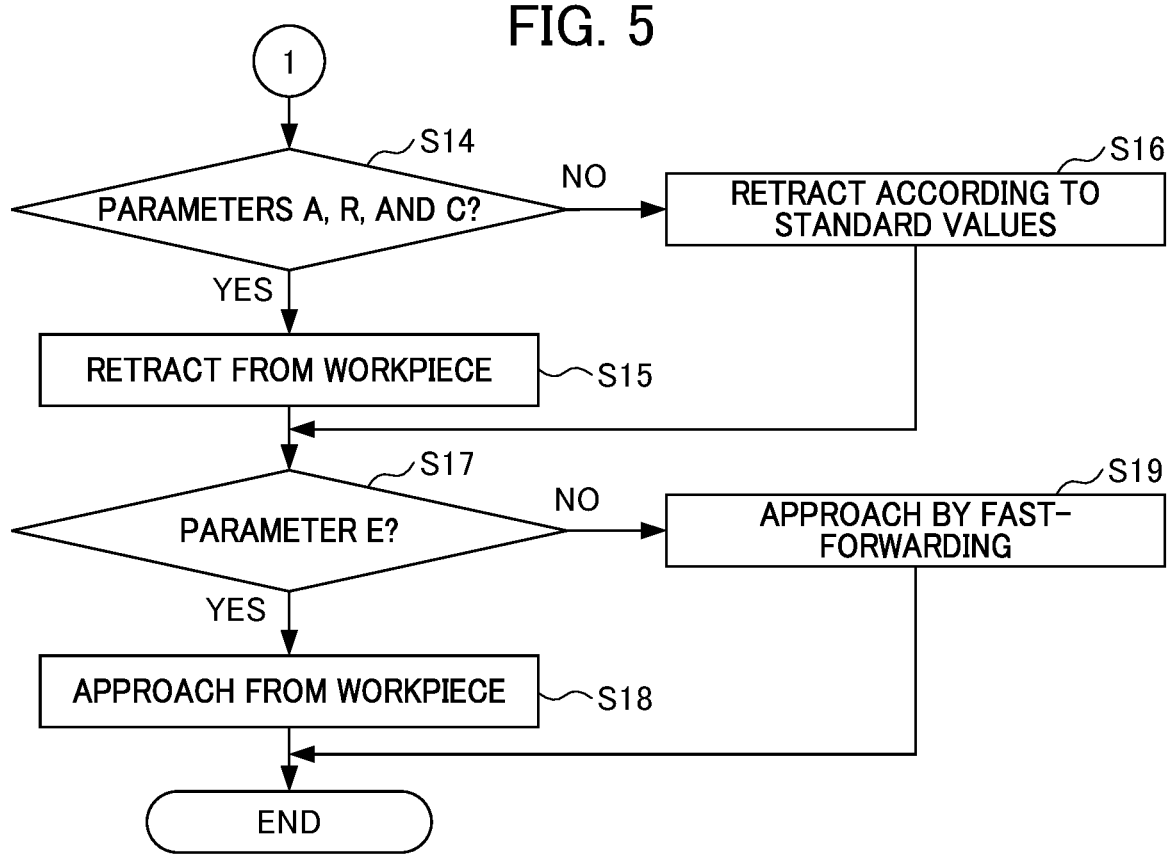
FIG. 5 is a flowchart showing the processing of the numerical control device.

FIGS. 4 and 5 are flowcharts showing the processing of the numerical control device 2. In Step S1, the machining program computing unit 212 reads the machining program from the storage unit (not shown). In Step S2, the machining program computing unit 212 selects the plane on which machining is to be performed as any of the parameters G17, G18, and G19 in the machining program.

In Step S3, the machining program computing unit 212 determines whether or not the position of the start point has been commanded in the machining program. In a case where the position of the start point has been commanded (YES), the processing proceeds to Step S5. In a case where the position of the start point is not commanded (NO), the processing proceeds to Step S4.

In Step S4, the machining program computing unit 212 sets, as the start point, an optional position on the plane selected in Step S2. In Step S5, the machining program computing unit 212 determines whether or not the parameter E (the approach speed) has been commanded in the machining program. In a case where the parameter E has been commanded (YES), the processing proceeds to Step S6. In a case where the parameter E is not commanded (NO), the processing proceeds to Step S7.

In Step S6, the true circular machining unit 211 causes the cutting tool 31 to approach the workpiece 32 according to the command of the parameter E. In Step S7, the true circular machining unit 211 causes the cutting tool 31 to approach the workpiece 32 by fast-forwarding.

In Step S8, the machining program computing unit 212 determines whether or not the parameters A (the approach angle), R (the advance radius), and C (the start position) have been commanded in the machining program. In a case where the parameters A, R, and C have been commanded (YES), the processing proceeds to Step S9. In a case where the parameters A, R, and C are not commanded (NO), the processing proceeds to Step S10.

In Step S9, the true circular machining unit 211 causes the cutting tool 31 to advance into the workpiece 32 according to the commands of the parameters A, R, and C. In Step S10, the true circular machining unit 211 causes the cutting tool 31 to advance into the workpiece 32 according to standard values including a parameter A of 90°, a parameter R of ½ of I, and a parameter C of 0°, for example.

In Step S11, the machining program computing unit 212 determines whether or not the parameters X, Y, and Z (the helical movement amount) and the parameter Q (the pitch) have been commanded in the machining program. In a case where the parameters X, Y, and Z and the parameter Q have been commanded (YES), the processing proceeds to Step S13. In a case where the parameters X, Y, and Z and the parameter Q are not commanded (NO), the processing proceeds to Step S12.

In Step S12, the true circular machining unit 211 causes the cutting tool 31 to perform true circular machining on the workpiece 32 according to the machining program. In Step S13, the true circular machining unit 211 causes the cutting tool 31 to helically machine the workpiece 32 according to the machining program.

In Step S14, the machining program computing unit 212 determines whether or not the parameters A (the approach angle), R (the advance radius), and C (the start position) have been commanded in the machining program. In a case where the parameters A, R, and C have been commanded (YES), the processing proceeds to Step S15. In a case where the parameters A, R, and C are not commanded (NO), the processing proceeds to Step S16.

In Step S15, the true circular machining unit 211 causes the cutting tool 31 to retract from the workpiece 32 according to the commands of the parameters A, R, and C. In Step S16, the true circular machining unit 211 causes the cutting tool 31 to retract from the workpiece 32 according to the standard values including a parameter A of 90°, a parameter R of ½ of I, and a parameter C of 0°, for example.

In Step S17, the machining program computing unit 212 determines whether or not the parameter E (the approach speed) has been commanded in the machining program. In a case where the parameter E has been commanded (YES), the processing proceeds to Step S18. In a case where the parameter E is not commanded (NO), the processing proceeds to Step S19.

In Step S18, the true circular machining unit 211 causes the cutting tool 31 to approach from the workpiece 32 according to the command of the parameter E. In Step S19, the true circular machining unit 211 causes the cutting tool 31 to approach from the workpiece 32 by fast-forwarding.

The embodiment of the present invention has been described above, but the present invention is not limited to the above-described embodiment. The advantageous effects described in the present embodiment have merely been listed as most suitable advantageous effects of the present invention, and the advantageous effects of the present invention are not limited to those described in the present embodiment.

EXPLANATION OF REFERENCE NUMERALS

1 Machining System
2 Numerical Control Device
3 Machine Tool
21 Control Unit
211 True Circular Machining Unit
212 Machining Program Computing Unit

The invention claimed is:
1. A numerical control device comprising:
a machining program computing unit that computes, as a command executable by a machine tool, a machining position from a one-line machining program for commanding the machine tool; and a true circular machining unit that performs true circular machining on a workpiece about a start point as a center with a cutting tool according to the executable command, wherein in a case where no cancellation code is commanded after commanding of the one-line machining program, when an optional position on a commanded plane is commanded, the commanded optional position is taken as the start point, and true circular machining on the workpiece is performed about the start point as a center with the cutting tool of the machine tool.

2. The numerical control device according to claim 1, wherein the machining program includes a G-code, a radius of a true circle to be machined, the start position, a radius of a trajectory along which the cutting tool advances into the workpiece or retracts from the workpiece, an approach angle of the cutting tool, an amount of helical movement in each linear axis upon helical machining by the cutting tool, a pitch in each linear axis upon the helical machining, a tool diameter correction number for the cutting tool, a feed speed for cutting by the cutting tool, and an approach speed of the cutting tool.

3. The numerical control device according to claim 2, wherein the machining program computing unit is able to change, in the machining program, tool diameter correction, selection of a plane on which cutting by the cutting tool is performed, the start position, the radius of the trajectory along which the cutting tool advances into the workpiece or retracts from the workpiece, the helical movement amount, the pitch, the tool diameter correction number, the feed speed, and the approach speed.

4. A numerical control device control method, comprising:

a step of computing, as a command executable by a machine tool, a machining position from a one-line machining program for commanding the machine tool; and a step of true circular machining on a workpiece about a start point as a center with a cutting tool of the machine tool according to the executable command, wherein in a case where no cancellation code is commanded after commanding of the one-line machining program, when an optional position on a commanded plane is commanded, the commanded optional position is taken as the start point, and true circular machining on the workpiece is performed about the start point as a center with the cutting tool of the machine tool.

\* \* \* \* \*